(12) United States Patent  
Thorpe

(10) Patent No.: US 9,139,382 B2  
(45) Date of Patent: Sep. 22, 2015

(54) LAUNDRY TRANSFER APPARATUS AND METHOD

(71) Applicant: Jensen USA Inc., Panama City, FL (US)

(72) Inventor: James Christopher Thorpe, Panama City, FL (US)

(73) Assignee: Jensen USA, Inc., Panama City, FL (US)

( * ) Notice: Subject to any disclaimer, the term of this patent is extended or adjusted under 35 U.S.C. 154(b) by 109 days.

(21) Appl. No.: 13/760,585

(22) Filed: Feb. 6, 2013

(65) Prior Publication Data

US 2014/0219732 A1 Aug. 7, 2014

(51) Int. Cl.
*B65G 53/40* (2006.01)
*B65G 51/02* (2006.01)
*B65G 47/14* (2006.01)

(52) U.S. Cl.
CPC ............ *B65G 51/02* (2013.01); *B65G 47/1485* (2013.01); *B65G 2201/0229* (2013.01)

(58) Field of Classification Search
USPC ............. 406/32, 52, 114, 116, 151, 152, 153; 414/797
See application file for complete search history.

(56) References Cited

U.S. PATENT DOCUMENTS

| | | | | |
|---|---|---|---|---|
| 2,983,275 A * | 5/1961 | Volckers | ........................ | 131/108 |
| 4,264,241 A * | 4/1981 | Hock | ............................ | 406/109 |
| 4,436,457 A * | 3/1984 | Willingham | ................... | 406/116 |
| 4,470,729 A * | 9/1984 | Fredenburg et al. | .......... | 406/116 |
| 5,651,483 A * | 7/1997 | Bell et al. | ........................ | 223/112 |
| 5,709,506 A * | 1/1998 | Beard et al. | ......................... | 406/1 |
| 6,089,810 A * | 7/2000 | Heinz et al. | ...................... | 414/13 |
| 6,330,813 B2 * | 12/2001 | Patel et al. | ....................... | 65/483 |
| 6,364,579 B1 * | 4/2002 | Gerber | ........................... | 406/172 |
| 6,375,393 B1 * | 4/2002 | Migliorini | ...................... | 406/181 |
| 6,386,801 B1 * | 5/2002 | Migliorini | ...................... | 406/197 |
| 6,619,525 B2 * | 9/2003 | Frankeburger et al. | ........... | 226/7 |
| 7,318,459 B2 * | 1/2008 | Frankeberger et al. | .......... | 141/67 |
| 7,913,834 B2 * | 3/2011 | Paterlini | ..................... | 198/470.1 |
| 8,322,951 B2 * | 12/2012 | Kvalheim | ...................... | 406/109 |
| 2005/0175420 A1* | 8/2005 | Heinz | ............................. | 406/113 |
| 2010/0138034 A1* | 6/2010 | Osiensky et al. | ............. | 700/218 |

* cited by examiner

*Primary Examiner* — Joseph Dillon, Jr.

(74) *Attorney, Agent, or Firm* — Merek, Blackmon & Voorhees, LLC

(57) ABSTRACT

Laundry transfer apparatus, and a method of transferring laundry items. The laundry apparatus comprises a rotatable disk carousel for receiving laundry items on a laundry receiving surface thereof, and a suction nozzle located relative to said laundry receiving surface for drawing laundry items from said laundry receiving surface into a laundry delivery conduit. The suction nozzle is vertically movable relative to the laundry receiving surface of the rotatable disk carousel and is rotatable about a vertical axis. The method of transferring laundry items, comprises the steps of: delivering laundry items onto the laundry receiving surface of a rotating disk carousel, and suctioning laundry items from the laundry receiving surface of the rotating disk carousel into a laundry delivery conduit. The transferred laundry items may be wet or dry laundry items.

13 Claims, 4 Drawing Sheets

LAUNDRY TRANSFER APPARATUS AND METHOD

FIELD OF THE INVENTION

The present invention relates to apparatus for, and a method of, laundry transfer, in particular to the transfer of laundry within a commercial laundry.

BACKGROUND OF THE INVENTION

In a commercial laundry, laundry items are transferred between washing and drying machines. Typical items of laundry include uniforms, towels and sheets. Various methods are known for loading laundry machines and for keeping batches of laundry together as they pass through the different stages of the laundering process.

A known method of transferring laundry items from a washing machine to a drying machine uses an automated shuttle conveyor that travels along a rail system. The shuttle conveyor is aligned with the opening of a washing machine, and wet laundry items are discharged into the shuttle conveyor. The shuttle conveyor is aligned with the opening of a drying machine, and the wet laundry items are transferred into the drying machine. A problem with this method is that the shuttle conveyor moves automatically and therefore represents a safety hazard within the laundry.

An alternative known method of transferring laundry items from a washing machine to a drying machine uses a manually operated cart that has a sling lining. An operative manually loads wet laundry items from a washing machine into the sling. The loaded sling is then hoisted up onto a rail system and pushed to the drying machine. The wet laundry items are transferred into the drying machine manually. A problem with this method is that the method is labor intensive, and potentially hazardous to the operative.

SUMMARY OF THE INVENTION

According to a first aspect there is provided laundry transfer apparatus comprising: a rotatable disk carousel for receiving laundry items on a laundry receiving surface thereof from a laundry conveyor, and a suction nozzle located relative to said laundry receiving surface for drawing laundry items from said laundry receiving surface into a laundry delivery conduit.

In an embodiment, the suction nozzle is vertically movable relative to the laundry receiving surface of the rotatable disk carousel. The suction nozzle may be telescopically adjustable in length.

In an embodiment, the suction nozzle is rotatable about a vertical axis.

According to a second aspect there is provided a method of transferring laundry items, comprising the steps of: a) delivering laundry items onto the laundry receiving surface of a rotating disk carousel, and b) suctioning laundry items from the laundry receiving surface of the rotating disk carousel into a laundry delivery conduit.

In an embodiment, step a) comprises feeding laundry items onto the laundry receiving surface of the rotating disk carousel by the use of one of: a belt conveyor, a sling discharge apparatus, a cart tipper.

The laundry items may be wet and/or dry laundry items.

The laundry delivery conduit may be configured to supply laundry items to a stock box and/or a dryer.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE EMBODIMENTS

There will now be described by way of example a specific mode contemplated by the inventor. In the following description numerous specific details are set forth in order to provide a thorough understanding. It will be apparent however, to one skilled in the art, that the present invention may be practiced without limitation to these specific details. In other instances, well known methods and structures are not described in detail so as not to unnecessarily obscure the description.

Figure 1:
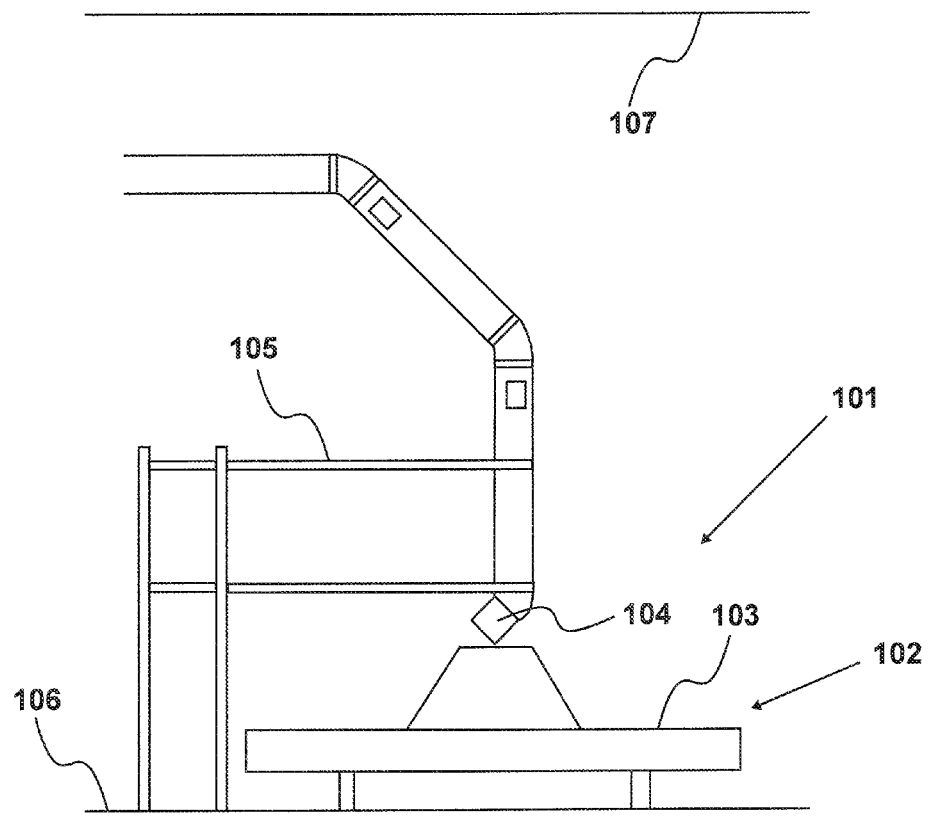
FIG. 1 shows laundry transfer apparatus.

FIG. 1 shows laundry transfer apparatus 101 for use in transferring laundry items within a laundry. Laundry transfer apparatus 101 comprises a rotatable disk carousel 102 for receiving laundry items on a laundry receiving surface 103 thereof, and a suction nozzle 104 located relative to the laundry receiving surface 103 for drawing laundry items from the laundry receiving surface 103 into a laundry delivery conduit. The laundry items may be wet laundry items and/or dry laundry items. The laundry items may be wet laundry items from a washing machine for transfer to a stock box or drying machine. The suction nozzle 104 is supported by a frame 105. The frame is mountable to a floor 106; alternatively, or additionally, the frame 105 is mountable to a ceiling 107. In the illustrated arrangement of FIG. 1, the frame 106 is mounted to the floor only.

The rotatable disk carousel 102, in combination with the suction nozzle 104, is used to enable a continuous flow of laundry items.

Figure 2:
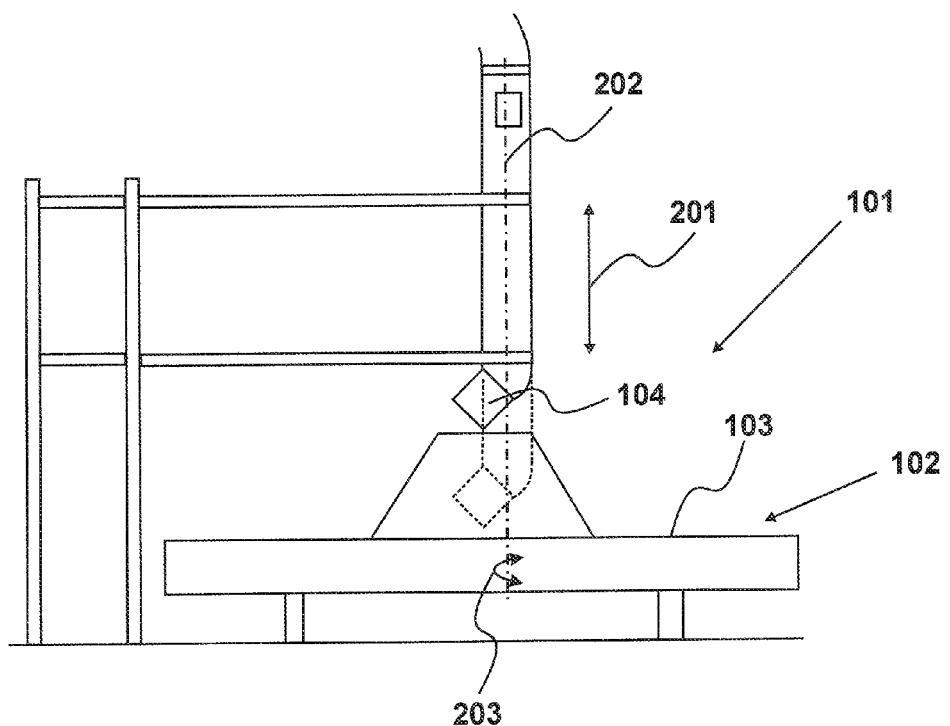
FIG. 2 shows further details of the laundry transfer apparatus of FIG. 1.

Further details of the laundry transfer apparatus 101 are shown in FIG. 2. The suction nozzle 104 is vertically movable relative to the laundry receiving surface 103 of the rotatable disk carousel 102, in a direction as indicated by arrow 201. The suction nozzle 104 may be telescopically adjustable in length, to achieve lifting and lowering of the suction nozzle 104. The suction nozzle 104 is also rotatable about a vertical axis 202, in a direction as indicated by arrow 203. The suction nozzle 104 can therefore be moved upwards or downwards, and can be rotated horizontally so as to pan across a portion of the laundry receiving surface 103 of the rotatable disk carousel 102.

Figure 3:
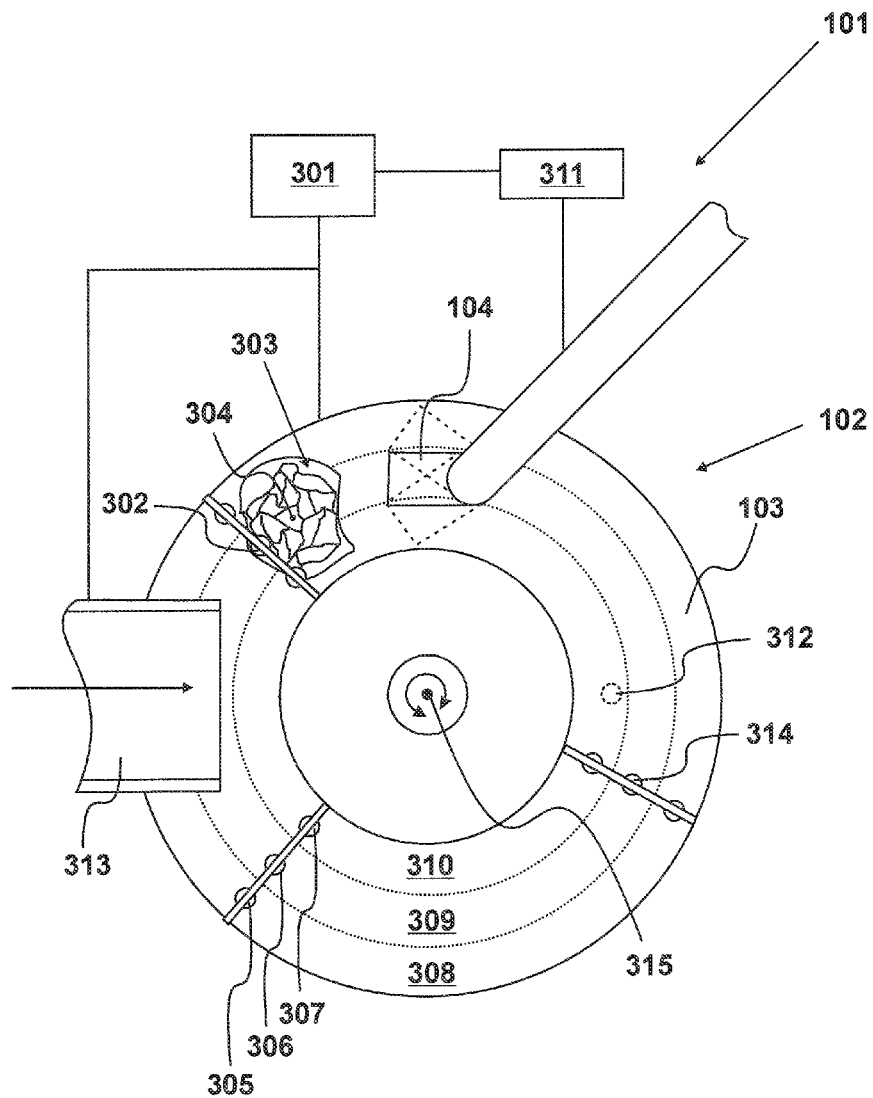
FIG. 3 shows yet further details of the laundry transfer apparatus of FIG. 1.

Yet further details of the laundry transfer apparatus 101 are illustrated in FIG. 3. The laundry transfer apparatus 101 comprises a programmable controller 301. In use, the suction nozzle 104 is moved vertically and horizontally under the control of the programmable controller 301 to be positioned for selecting laundry items from the laundry receiving surface 103 of the rotatable disk carousel 102.

The laundry transfer apparatus 101 comprises at least one height sensor 302, for sensing the height of a stack of laundry on the laundry receiving surface 103 of the rotatable disk carousel 102 and providing an input signal to the programmable controller 301. The programmable controller 301 is so programmed as to locate the suction nozzle 104 to draw in laundry items from the top 303 of a stack of laundry 304. This approach ensures that the most easily pickable item of laundry is selected as the next laundry item to be drawn into the suction nozzle 104.

Typically, the degree of suction provided in the suction nozzle 104 and the dimensions of the nozzle are such that only one or two items of laundry will be suctioned into the suction nozzle 104 at a time. In addition, rotation of the suction nozzle 104 serves to allow items that are wider than the suction nozzle 104 to be drawn therein from the rotatable disk carousel 102. This feature serves to reduce blockages in the suction nozzle 104.

In the arrangement shown in FIG. 3, the laundry transfer apparatus 101 comprises a plurality of height sensors 305, 306, 307 for sensing the height of a stack of laundry within an individual radial band 308, 309, 310 respectively of the laundry receiving surface 103 of the rotatable disk carousel 102 and providing an input signal to the programmable controller 301. The programmable controller 301 is so programmed as to locate the suction nozzle 104 to draw in laundry items from the top of the highest stack of laundry on the laundry receiving surface 103, and in the event that the height of a stack of laundry within each of a plurality of the individual radial bands 305, 306, 307 are the same height, to draw in laundry items from the top of the highest stack of laundry in the closest radial band. For example, if the suction nozzle 104 is located to select a laundry item from the middle radial band 309, and the height of the laundry is the same in the middle and outer radial bands 309, 308, the programmable controller 301 will initially maintain the suction nozzle 104 in the middle radial band 309 before rotating the suction nozzle 104 to select items from the outer radial band 308. By way of further example, if the suction nozzle 104 is located to select a laundry item from the inner radial band 310, and the height of the laundry is the same in the middle and outer radial bands 309, 308, the programmable controller 301 will locate the suction nozzle 104 into the middle radial band 309 before locating the suction nozzle 104 in the outer radial band 308.

The laundry transfer apparatus 101 may comprise an air pressure monitor 311 for monitoring the static pressure within the suction nozzle 104 and for providing an input signal to the programmable controller 301. During operation, the detection of a decrease in static pressure within the suction nozzle 104 below a threshold value is treated as indicating a suction nozzle blockage. In response the air flow creating the suction within the suction nozzle 104 is cut off, to allow the blocked item or items of laundry to fall from the suction nozzle 104 to clear the blockage. This may be achieved by any suitable means. For example, the air flow may be cut off by stopping a fan apparatus creating the suction, or a slide gate may be closed to stop the air flow.

The laundry transfer apparatus 101 may also comprise at least one weight sensor 312 for sensing the weight of laundry items on the laundry receiving surface 103 of the rotatable disk carousel 102 and providing an input signal to the programmable controller 301. The weight upon the rotatable disk carousel 102 may then be monitored to detect an overloading condition or an unexpected loading condition. During operation, the detection of an increase in weight above a threshold value is treated as indicating an abnormal load. In response, an alarm signal may be generated and/or an operational function may be executed to prevent damage to the laundry transfer apparatus and/or laundry.

The rotatable disk carousel 102 may be configured to receive laundry items from any suitable laundry feeding or delivery apparatus. For example, laundry items may be placed onto the laundry receiving surface 103 of the rotatable disk carousel 102 by the use of a belt conveyor, a sling discharge apparatus or a cart and tipper apparatus.

In the illustrated arrangement of FIG. 3, the rotatable disk carousel 102 is configured to receive laundry items from a belt conveyor 313.

The programmable controller 103 is so programmed as to control the delivery of items from the belt conveyor 313 onto the rotatable disk carousel 102, depending on the presence and position of laundry items upon the laundry receiving surface 103 of the rotatable disk carousel 102. The programmable controller 103 may interpret an input signal from a height sensor 302 or weight sensor 312 to determine the presence of an item at a particular position on the rotatable disk carousel 102. Alternatively, the laundry transfer apparatus 101 may comprise at least one laundry item presence detector 314 for detecting the presence of laundry at a particular position on the laundry receiving surface 103 of the rotatable disk carousel 102 and providing an input signal to the programmable controller 103. To control the delivery of items upon the rotatable disk carousel 102, the programmable controller 103 is so programmed as to stop and start the belt conveyor 313 depending on the position of laundry items upon the rotatable disk carousel 102 relative to the position of the belt conveyor 313. The programmable controller 301 may also be so programmed as to control the speed of the belt conveyor 313. Rotation of the rotatable disk carousel 102 may also be controlled by the programmable controller 301.

Figure 4:
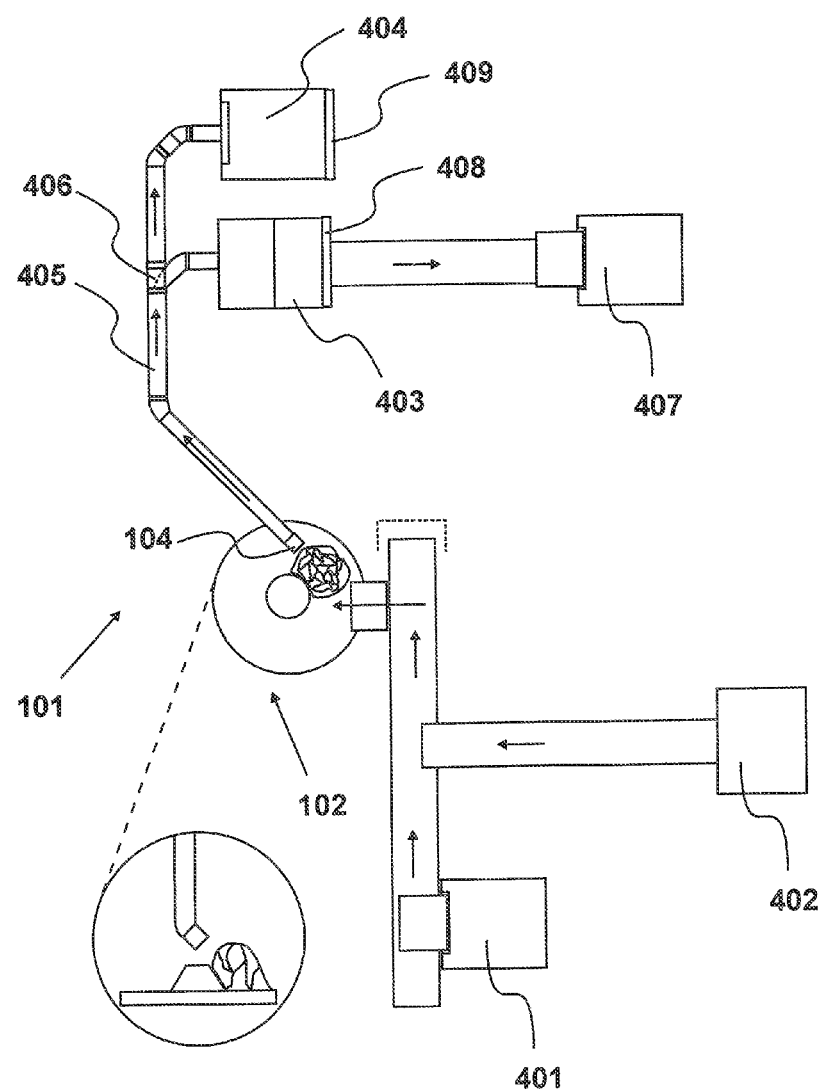
FIG. 4 is a schematic showing the laundry transfer apparatus of FIG. 1 within a laundry.

FIG. 4 is a schematic showing the laundry transfer apparatus 101 in use in a commercial laundry. The laundry transfer apparatus 101 is shown in a process line in which laundry items may be transferred from a washing machine 401 or source of laundry items 402, to a stock box 403 or a drying machine 404. In the illustrated arrangement, the suction nozzle 401 of laundry transfer apparatus 101 is connected to a laundry delivery conduit 405, and a diverter 406 is usable to divert laundry items within the laundry delivery conduit 405 to a selected station. It is to be appreciated that the laundry transfer apparatus 101 may be used with wet and/or dry items, which may be soiled or clean. For example, washed laundry items can be transferred from washing machine 401 to drying machine 404, and laundry items to be washed can be transferred from the source of laundry items 402 to stock box 403 for supply to washing machine 407.

If the suction nozzle 401 is to supply laundry items to a stock box 402, a fan 408 of the stock box 403 is used to create the suction within the suction nozzle 401 and laundry delivery conduit 404. The laundry transfer apparatus 101 may be used to delivery items to a stock box of the type described in European Patent Publication No. EP 2 055 828 A1, in the name of the present Applicant. If the suction nozzle 401 is to supply laundry items to a drying machine 404, a fan 409 of the drying machine 404 is used to create the suction within the suction nozzle 401 and laundry delivery conduit 405.

In operation, the transfer of laundry may be performed in batches on an individual load basis. For example, a single load of laundry is discharged from washing machine 401, delivered onto the rotating disk carousel 102, sucked through the suction nozzle 401 into the laundry delivery conduit 404 and to either of the stock box 402 or drying machine 403. Alternatively, the transfer of laundry may be performed in batches according to a load weight basis, or in batches according to a counted item basis. The batching of laundry may be performed upstream or downstream of vacuuming by the suction nozzle 104 from the rotating disk carousel 102.

The rotatable disk carousel 102 and the suction nozzle 104 may have any suitable dimensions, and the laundry receiving surface 103 of the rotatable disk carousel 102 may comprise any suitable material, profile or finish. The rotatable disk carousel 102 may have any suitable profile for supporting laundry items thereon. The rotatable disk carousel 102 and the suction nozzle 104 may be fabricated from any suitable material or combination or materials, and be manufactured using any suitable process or combination of processes.

The laundry transfer apparatus, and method of transferring laundry as described herein, provides for a continuous transfer of laundry items, with an associated improvement in operational performance and efficiency.

What is claimed is:

1. Laundry transfer apparatus comprising:
   a rotatable disk carousel for receiving laundry items on a laundry receiving surface thereof,
   a suction nozzle located relative to said laundry receiving surface for drawing laundry items from said laundry receiving surface into a laundry delivery conduit,
   a programmable controller, and
   a plurality of height sensors for sensing the height of a stack of laundry within an individual radial band of the laundry receiving surface of said rotatable disk carousel and providing an input signal to said programmable controller,
   wherein said programmable controller is so programmed as to locate said suction nozzle to draw in laundry items from the top of the highest stack of laundry and in the event that the height of a stack of laundry within each of a plurality of said individual radial bands are the same height, to draw in laundry items from the top of the highest stack of laundry in the closest individual radial band.

2. The laundry transfer apparatus of claim 1, wherein said suction nozzle is vertically movable relative to said laundry receiving surface of said rotatable disk carousel.

3. The laundry transfer apparatus of claim 2, wherein said suction nozzle is telescopically adjustable in length.

4. The laundry transfer apparatus of claim 1, wherein said suction nozzle is rotatable about a vertical axis.

5. The laundry transfer apparatus of claim 1, wherein said suction nozzle is supported by a frame.

6. The laundry transfer apparatus of claim 5, wherein said frame is mountable to at least one of: a floor, a ceiling.

7. The laundry transfer apparatus of claim 1, comprising at least one weight sensor for sensing the weight of laundry items on said laundry receiving surface and providing an input signal to said programmable controller.

8. The laundry transfer apparatus of claim 1, wherein said programmable controller is so programmed as to control the speed of rotation of said rotatable disk carousel.

9. The laundry transfer apparatus of claim 1, wherein said rotatable disk carousel is configured to receive laundry items from one of: a belt conveyor, a sling discharge apparatus, a cart tipper.

10. The laundry transfer apparatus of claim 1, said rotatable disk carousel is configured to receive at least one of: wet laundry items, dry laundry items.

11. The laundry transfer apparatus of claim 1, wherein said laundry delivery conduit is configured to deliver laundry items to a stock box.

12. The laundry transfer apparatus of claim 1, wherein said laundry delivery conduit is configured to deliver laundry items to a dryer.

13. The laundry transfer apparatus of claim 1, wherein said plurality of height sensors are each located above a respective individual radial band of the laundry receiving surface of the rotatable disk carousel.

* * * * *